US008923492B2

(12) United States Patent
Zheng et al.

(10) Patent No.: US 8,923,492 B2
(45) Date of Patent: Dec. 30, 2014

(54) INTEGRATED CMOS MULTI-MODE DRIVERS

(71) Applicant: Broadcom Corporation, Irvine, CA (US)

(72) Inventors: Hui Zheng, Irvine, CA (US); Sasi Kumar Arunachalam, Irvine, CA (US); Alex Jianzhong Chen, Irvine, CA (US); Aravind Kumar Padyana, Irvine, CA (US); I-Ning Ku, Los Angeles, CA (US); Jungwoo Song, Irvine, CA (US); Xicheng Jiang, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/850,355

(22) Filed: Mar. 26, 2013

(65) Prior Publication Data

US 2014/0254779 A1    Sep. 11, 2014

Related U.S. Application Data

(60) Provisional application No. 61/772,777, filed on Mar. 5, 2013.

(51) Int. Cl.
*H04M 11/00* (2006.01)

(52) U.S. Cl.
CPC ...................................... *H04M 11/00* (2013.01)
USPC ....................................................... 379/93.01

(58) Field of Classification Search
None
See application file for complete search history.

(56) References Cited

U.S. PATENT DOCUMENTS

| 5,825,819 | A * | 10/1998 | Cogburn | 375/257 |
|---|---|---|---|---|
| 6,100,717 | A * | 8/2000 | May | 326/83 |
| 6,417,736 | B1 * | 7/2002 | Lewyn | 330/297 |
| 6,477,207 | B1 * | 11/2002 | Lindholm | 375/260 |
| 6,498,521 | B1 * | 12/2002 | Bicakci et al. | 327/110 |
| 6,567,491 | B1 * | 5/2003 | McCune et al. | 375/247 |
| 6,724,830 | B2 * | 4/2004 | Do et al. | 375/295 |
| 2001/0017893 | A1 * | 8/2001 | Do et al. | 375/247 |
| 2006/0034359 | A1 * | 2/2006 | Hauptmann et al. | 375/222 |
| 2006/0171527 | A1 | 8/2006 | Mills et al. | |
| 2011/0316634 | A1 * | 12/2011 | Vasani et al. | 330/296 |
| 2013/0003940 | A1 * | 1/2013 | Hauptmann et al. | 379/27.01 |

OTHER PUBLICATIONS

Pierdomenico, John et al, "A 684-mW Adaptive Supply Full-Rate ADSL CO Driver", IEEE Journal of Solid-State Circuits, Dec. 2002, vol. 37, No. 12, pp. 1831-1838, U.S.
Bicakci, Ara et al, "A CMOS Line Driver for ADSL Central Office Applications", IEEE Journal of Solid-State Circuits, Dec. 2003, vol. 38, No. 12, pp. 2201-2208, U.S.

* cited by examiner

*Primary Examiner* — Maria El-Zoobi
(74) *Attorney, Agent, or Firm* — Garlick & Markison; Bruce E. Garlick

(57) ABSTRACT

A multi-mode line driver circuit designed to be fabricated in a CMOS process and capable of supporting a plurality of operating modes corresponding, for example, to different profiles of communication standards such as xDSL standards. The line driver circuit incorporates integrated mode switches with a two-stage amplifier architecture to relax amplifier requirements by distributing the signal gain into two amplifier stages. Reconfigurable feedback loops are provided to permit design optimization for particular modes of operation (e.g., ADSL and VDSL compliant modes). In one embodiment implemented as a Class-H amplifier, lift amplifier(s) are provided between a first amplifier stage and a second amplifier stage for controlling voltage supply levels of the second amplifier stage. The lift amplifiers may be enabled by voltage threshold detection circuitry that monitors either the input or the output signals of the first amplifier stage depending on the operable transmission mode.

20 Claims, 11 Drawing Sheets

INTEGRATED CMOS MULTI-MODE DRIVERS

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

1. U.S. Provisional Patent Application Ser. No. 61/772,777, entitled "INTEGRATED CMOS MULTI-MODE DRIVERS,", filed Mar. 5, 2013.

BACKGROUND OF THE INVENTION

1. Technical Field of the Invention

The invention relates generally to line drivers for communication networks; and, more particularly, it relates to multi-mode line drivers for communication networks such as xDSL networks.

2. Description of Related Art

Line driver circuits are typically used to amplify the strength of input signals (digital or analog) and drive the signals over a transmission line. In certain applications, such as processing discrete multitone (DMT) signals in high data rate modem-related applications that must support wide signal swings on a line, line driver circuitry must adhere to relatively strict operating parameters, and may consume a relatively high percentage of system power.

For example, DSL (digital subscriber line) technology provides for the digital transmission of data over the wires of a local telephone network. Typically, in a DSL-based communication system, an Internet service provider (ISP) interfaces with an analog telephone line using a DSL modem. The DSL modem enables the ISP to communicate with consumers over the analog telephone line. Likewise, a consumer interfaces with the analog telephone line using a DSL modem to perform communications with the ISP. The DSL modem of the consumer extracts digital data from the analog telephone line that was transmitted by the ISP, and may provide the extracted digital data to a consumer device or network. Furthermore, the DSL modem of the consumer transmits digital data to the ISP over the analog telephone line. Typically, the download speed of consumer DSL services ranges from 512 kilobits per second (kbit/sec) to 24,000 kbit/sec or greater, depending on the type of DSL technology.

Various types of DSL technology exist, including Asymmetric Digital Subscriber Line (ADSL) and VHDSL or VDSL (Very High Speed DSL). In ADSL, upstream communication speeds (e.g., for transmissions from the consumer) are lower than downstream communication speeds (e.g., for transmissions from the ISP). With standard ADSL, a frequency band of 25.875 kHz to 138 kHz is used for upstream communications, and a frequency band of 138 kHz-2.2 MHz is used for downstream communications.

VDSL is a newer standard that provides for faster data transmissions than standard DSL or ADSL. For example, VDSL is capable of supporting high bandwidth applications such as HDTV. Communications according to VDSL are symmetric such that upstream and downstream communications may be performed at the same rates. Second-generation VDSL (VDSL2) systems utilize a bandwidth of up to 30 MHz to provide data rates exceeding 100 Mbit/s in both the upstream and downstream directions. The maximum available bit rate may be achieved at relatively short ranges, such as a range of up to about 300 meters.

As the different types of DSL technologies become more widespread, DSL modems capable of supporting multiple DSL standards (such as ADSL and VDSL2) are desired. However, to save costs, it is desired for DSL system solutions to use fewer components to reduce the resulting bill of materials (BOM). Such cost pressures, coupled with line driver power consumption requirements and other considerations, make it challenging to implement sufficiently acceptable DSL modems with multi-DSL technology capabilities.

DETAILED DESCRIPTION OF THE INVENTION

Designed to be fabricated in relatively low-cost complementary metal-oxide semiconductor (CMOS) manufacturing processes, a multi-mode or reconfigurable line driver architecture in accordance with the present disclosure is capable of supporting a plurality of operating modes. In application, each such operating mode may correspond, for example, to different profiles of one or more communication standards such as xDSL standards. As will be understood, the novel line driver architectures presented herein permit design optimization for different respective modes of operation, thereby enabling improved performance and lower power consumption as compared to prior designs.

While certain embodiments of the disclosure presented herein are described for use in xDSL (ADSL, VDSL, VDSL2, etc.) applications, various aspects and principles, and their equivalents, can also be extended generally to other access technologies and transmissions (regardless of the particular type of communication medium being employed such as wired, wireless, optical, et cetera), including transmissions over lossy or variable communication channels. In addition, although the line drivers of the disclosed embodiments are configured for differential operation, it will be appreciated that certain novel features are likewise applicable to single-ended driver configurations. In some instances, structures and components are shown in block diagram form in order to avoid obscuring the concepts of the subject technology.

Figure 1:
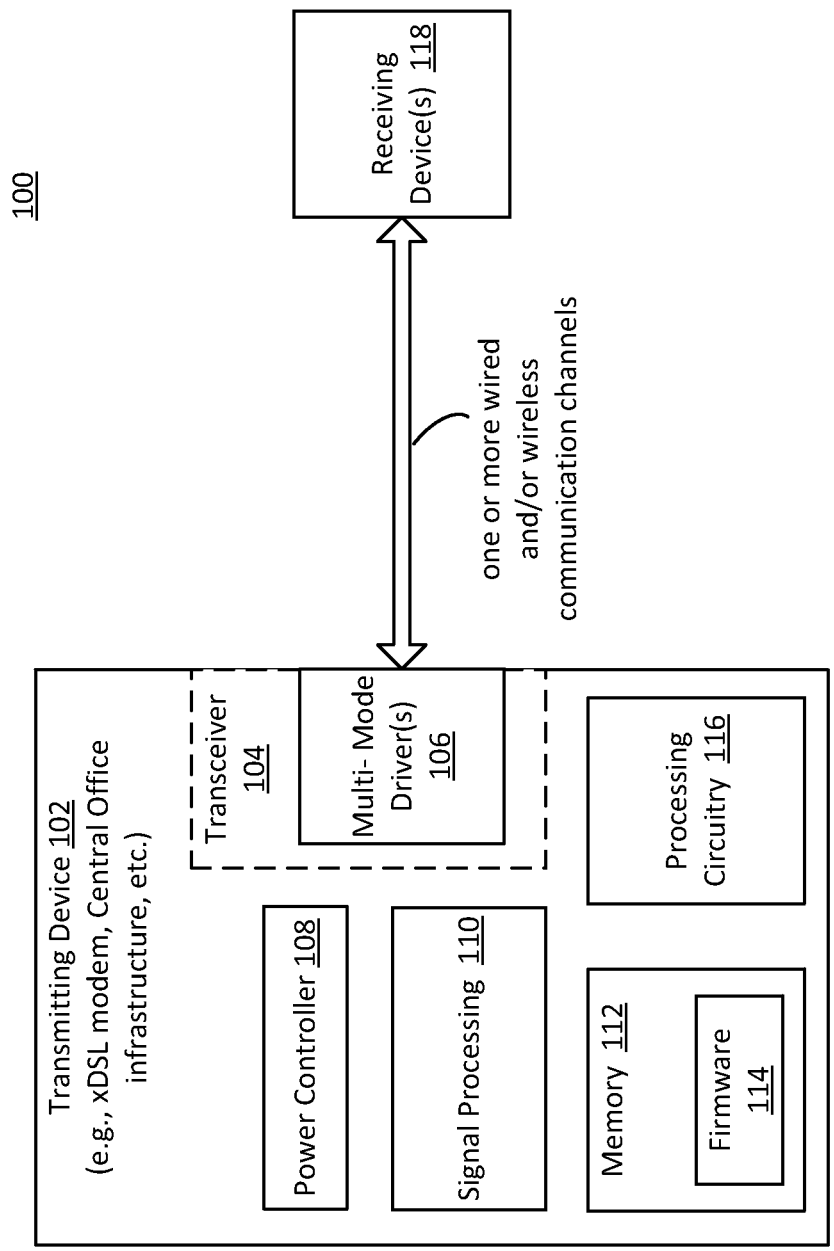
FIG. 1 is a functional block diagram representation of an exemplary communication network employing multi-mode driver circuitry in accordance with an embodiment of the present disclosure.

Referring more specifically to the figures, FIG. 1 is a functional block diagram representation of an exemplary communication network 100 employing multi-mode driver circuitry in accordance with an embodiment of the present disclosure. In the illustrated embodiment, a transmitting device 102 includes a transceiver 104 having a multi-mode driver(s) 106 for providing amplified signals to a receiving device(s) 118 via one or more wired and/or wireless communication channels. The transmitting device 102 of this embodiment further incorporates a power controller 108, signal processing functionality 110, and memory 112 for use in supporting communication operations and storing related firmware 114 and other applications. In addition, processing circuitry 116 may further support communication operations and other underlying functionality of the transmitting device 102.

By way of example and without limitation, the transmitting device 102 may take the form of modem functionality incorporated in the central office infrastructure of a service provider, or a standalone modem deployed at or near a customer premise. The transmitting device 102 may be designed to support provisioning of so-called triple play services (high speed internet access, television/high definition television, and telephone service) over a single broadband connection. For xDSL applications, for example, the transmitting device 102 may communicate over an existing infrastructure of copper wiring that was originally deployed for POTS (Plain Old Telephone) services. As will be understood, the multi-mode driver(s) 106 may be configured to support transmissions of various distances and over various other types of conductive lines or wireless communication channels.

Figure 2:
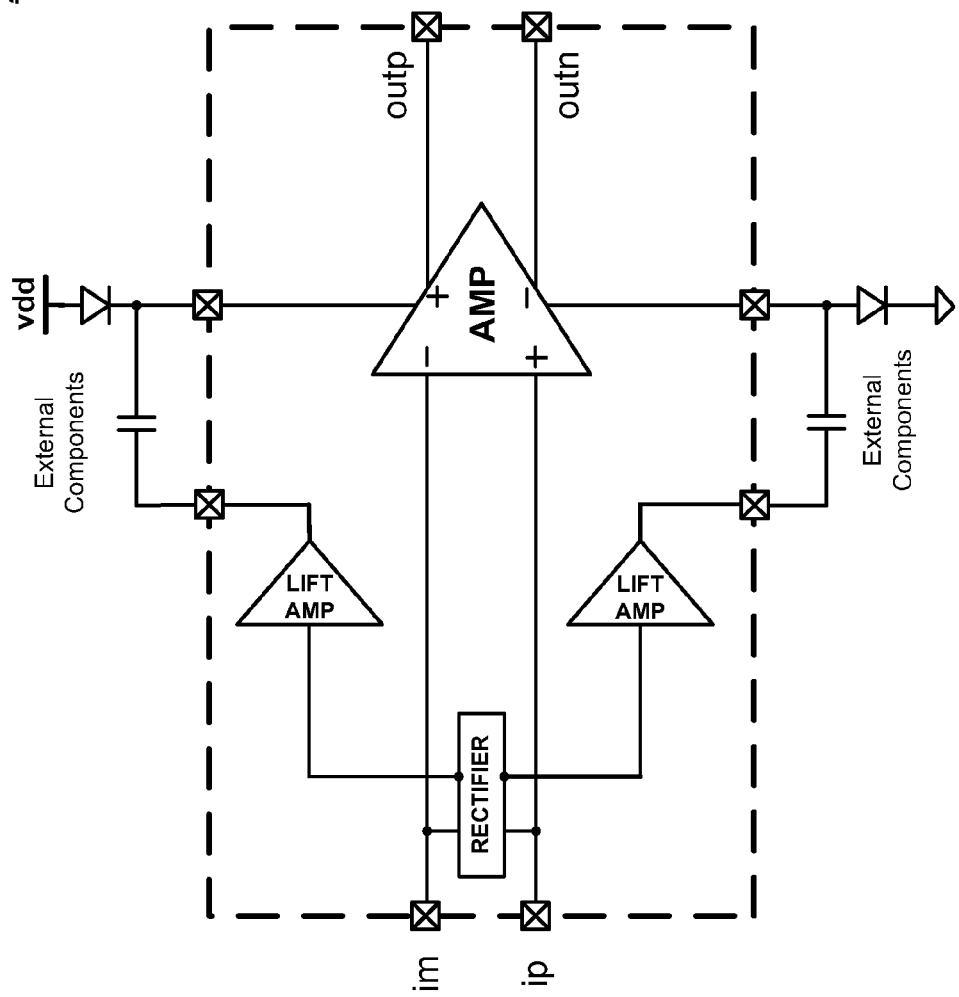
FIG. 2 shows a prior art, single-stage line driver.

FIG. 2 shows a prior art, single-stage Class-H line driver 200. Certain of such prior line driver architectures are designed to be manufactured in high-voltage bipolar transistor manufacturing processes that are relatively expensive as compared to CMOS manufacturing processes. Further, such architectures may require external mode switches (i.e., additional components and/or a relatively expensive multi-chip solution) in order to support multi-mode operations covering, for example, ADSL, VDSL17a and VDSL30a compliant modes of operation.

As is known, Class-H amplifiers utilize variable voltage supply rails (also referred to herein as "voltage supplies" or "voltage supply levels") that are modulated so that the rails are (typically) only a few volts larger than the output signal at any given time. In line driver 200, Class-H operation of the single-stage amplifier AMP is provided via a pair of lift amplifiers that function to modulate the voltage supply rails via external components. Such modulation permits the differential output signals outp and outn of the amplifier AMP to exceed the normative voltage of the supply rails. The lift amplifiers themselves are driven by rectified differential inputs ip and im.

As indicated, single-stage line drivers 200 are often implemented in a relatively expensive bipolar process technology in order to achieve the signal bandwidth performance and output power requirements of certain transmission modes. Implementations of single-stage driver architectures manufactured in a CMOS process may require unduly high power consumption in order to meet simultaneous requirements of low noise, low distortion and high bandwidth for different respective modes of operation. Single-stage Class-H drivers may further suffer from significant signal propagation delay mismatches between a lift voltage supply path and signal path due to relatively narrow driver bandwidths in ADSL-like applications.

Figure 3:
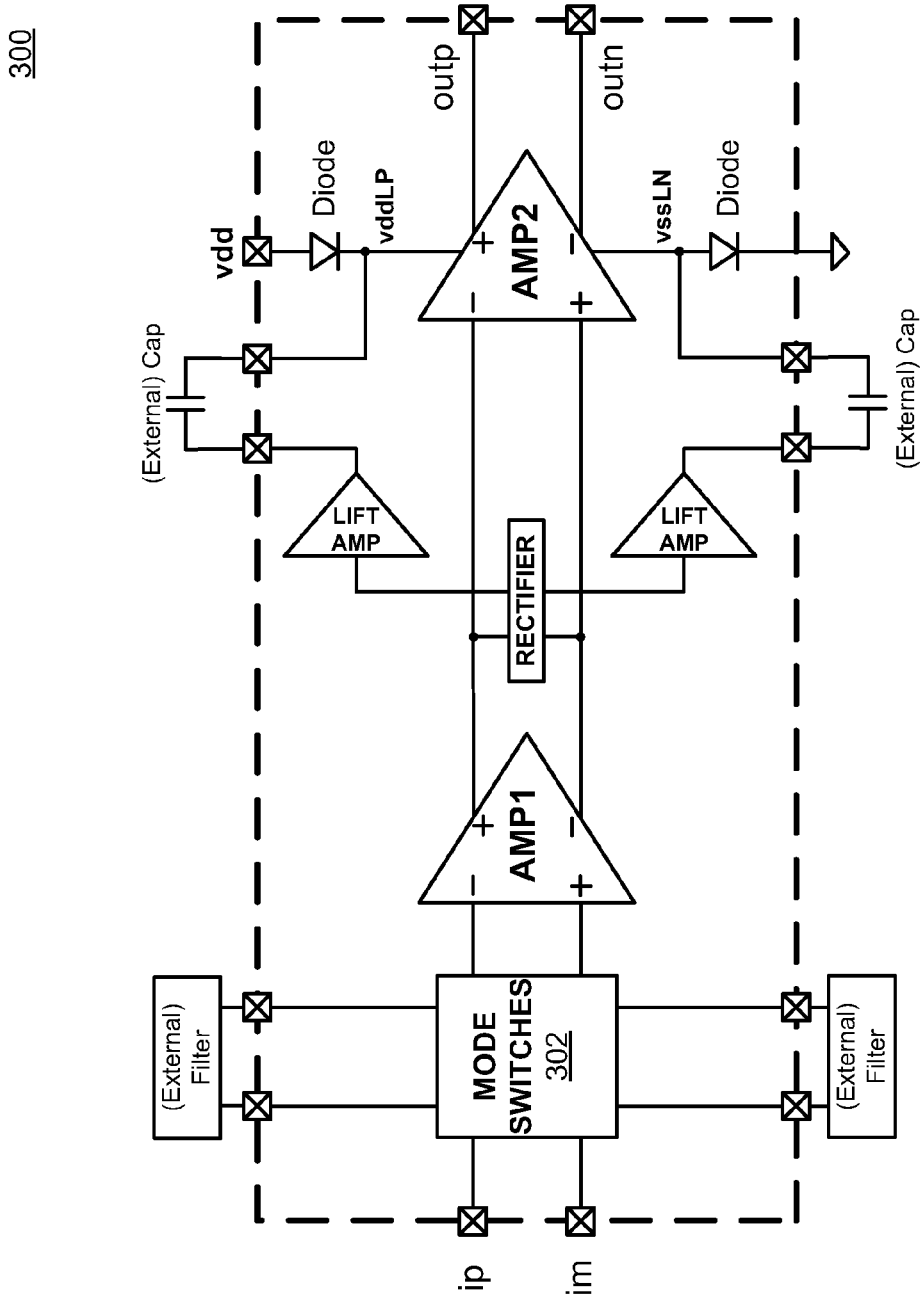
FIG. 3 illustrates a multi-mode, two-stage line driver circuit in accordance with an embodiment of the present disclosure.

FIG. 3 illustrates a multi-mode, two-stage line driver circuit 300 in accordance with an embodiment of the present disclosure. As noted, a line driver circuit 300 according to the present disclosure is capable of supporting a plurality of operating modes corresponding, for example, to different profiles of one or more communication standards such as xDSL standards. The exemplary embodiments described below permit design optimization for different respective modes of operation, thereby enabling improved performance and lower power consumption as compared to prior single-stage architectures.

In particular, a line driver circuit 300 according to various embodiments of the present disclosure incorporates integrated mode switches 302 and a two-stage amplifier architecture comprised of a first amplifier stage AMP1 and a second amplifier stage AMP2. In addition to relaxing driver design requirements, distributing the signal path gain into two amplifier stages provides greater flexibility when independently optimizing the driver circuit 300 for particular modes of operation (e.g., ADSL and VDSL compliant modes) via reconfigurable feedback loops established via mode switches 302.

Further, when the line driver circuit 300 is implemented as a Class-H amplifier, lift amplifiers are provided between the first amplifier stage AMP1 and second amplifier stage AMP2 for selectively varying the voltage supply levels vddLP and vssLN of the second amplifier stage AMP2. Capacitors (shown as external capacitors) couple the outputs of the lift amplifiers to the variable voltage supply rails, and function to block DC components of signals generated by the lift amplifiers. Schottky diodes are also provided to pass current from/to the normal, unmodulated supply rails when the lift amplifiers are disabled, and to isolate the variable voltage supply rails from the unmodulated supply rails when the lift amplifiers are enabled. Over-voltage protection schemes may also be provided at the variable voltage supply rails.

By driving the lift amplifiers with outputs of the first amplifier stage AMP1 as rectified by the illustrated rectifier, signal delay matching is improved between the "lift" voltage supply path and the signal driver path during Class-H operation (e.g., in both ADSL and VDSL modes of operation). As described more fully below, the lift amplifiers may be enabled by voltage threshold detection circuitry configured to compare one or more predetermined threshold voltages to either the differential outputs of the first amplifier stage AMP1 (as shown in the ADSLx transmission mode configuration of FIG. 6) or the differential inputs of the first amplifier stage AMP1 (as shown in the VDSLx transmission mode configuration of FIG. 8).

In a VDSL mode of operation, for example, the two-stage architecture allows the lifted voltage supply to be enabled relatively early as compared to prior single-stage driver designs. In an ADSL mode of operation, the disclosed two-stage architecture produces well-matched phase between a lift voltage enable signal and a related driver output signal DRV_out, whereas in a single-stage architecture the supply control signal may undesirably lead the driver output signal. In addition, the first amplifier stage AMP1 of the illustrated embodiment is powered by a constant or relatively constant voltage supply, thereby providing improved distortion performance and reducing overall power consumption during operation.

Figure 4:
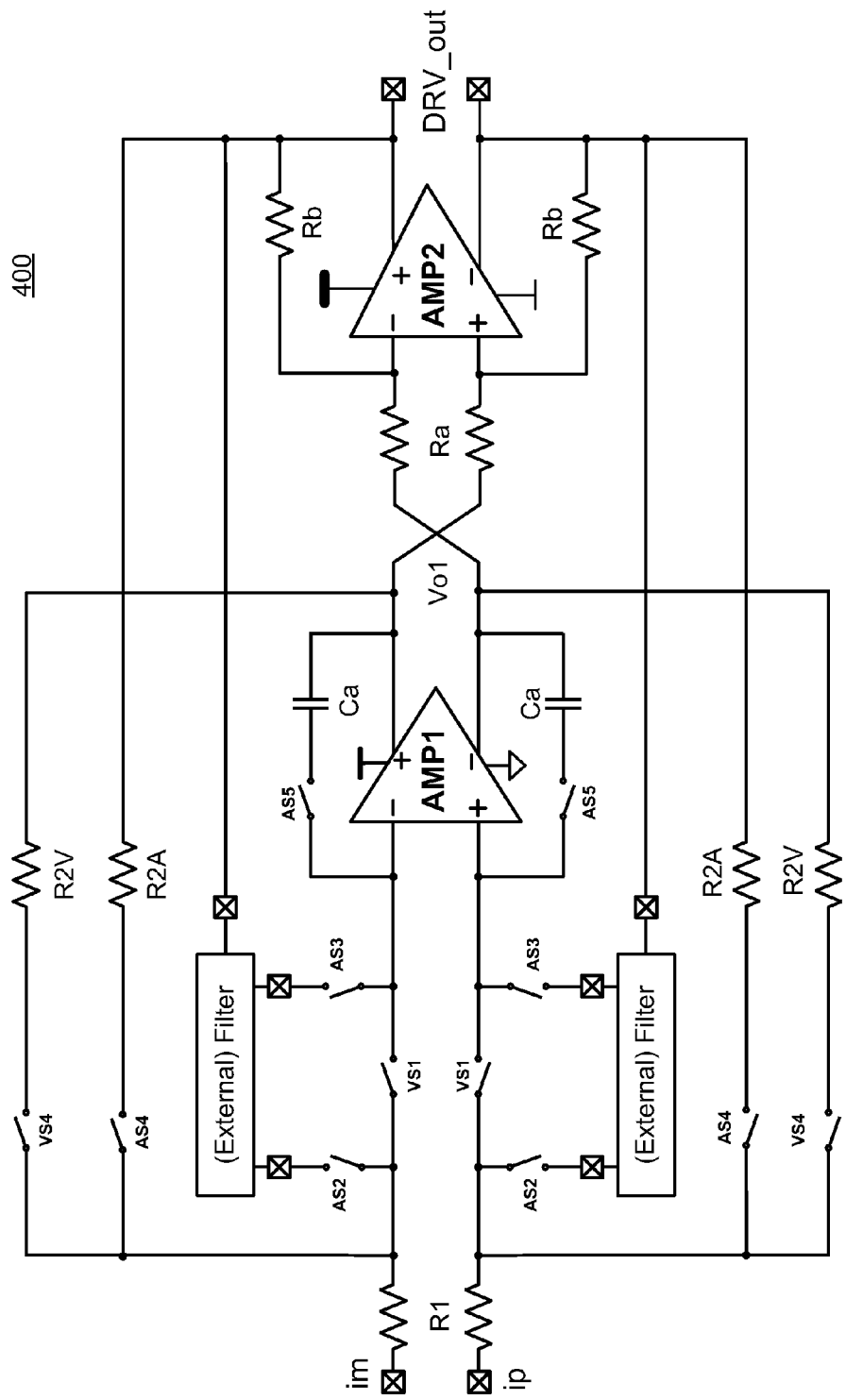
FIG. 4 is a reconfigurable two-stage line driver circuit in accordance with an embodiment of the present disclosure.

FIG. 4 is a reconfigurable (ADSLx/VDSLx) two-stage line driver circuit 400 in accordance with an embodiment of the present disclosure. In the illustrated embodiment, various mode switches are shown for use in establishing reconfigurable feedback loops/paths corresponding to desired modes of operation as described more fully below in conjunction with FIGS. 5 and 7.

Briefly, when operation in an ADSLx mode is desired, mode switches AS2, AS3, AS4 and AS5 are electrically closed, while mode switches VS1 and VS4 remain in an open (or non-conducting) state. Conversely, when operation in a VDSLx mode is desired, mode switches VS1 and VS4 are electrically closed while mode switches AS2, AS3 and AS5 remain in an open state. In this manner, passive elements such as resistors R2A and R2V and capacitors C6, as well as external filter components, may be selectively employed in feedback loops optimized for particular transmission modes.

Figure 5:
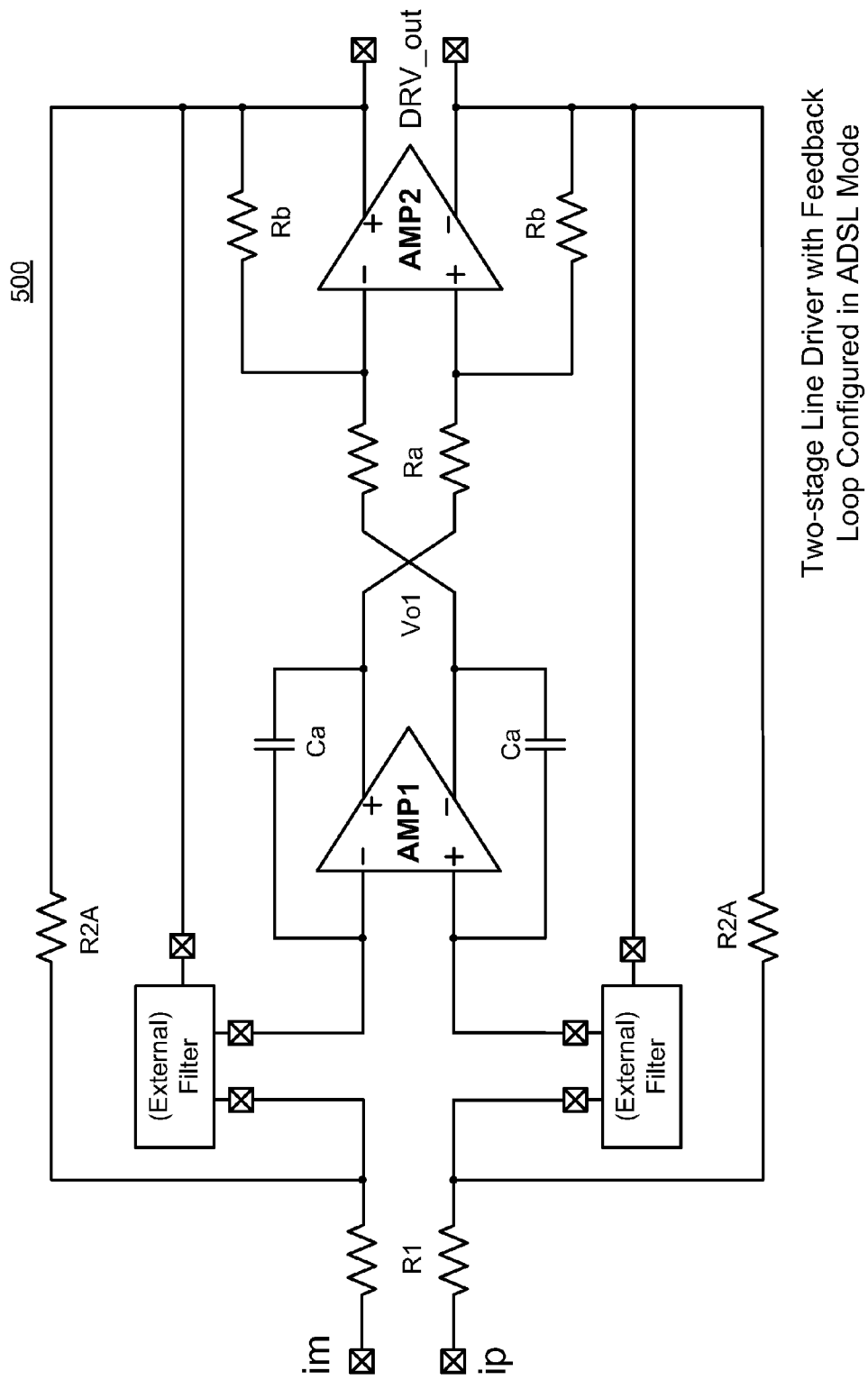
FIG. 5 is a line driver circuit configured to operate in an ADSLx mode in accordance with an embodiment of the present disclosure.

FIG. 5 is a line driver circuit 500 configured to operate in an ADSLx mode in accordance with an embodiment of the present disclosure. In this transmission mode, feedback resistors R2A is coupled from the output DRV_OUT of the second amplifier stage AMP2 to the input of the first amplifier stage AMP1 (via external passive filter circuitry). In addition, feedback capacitors Ca are coupled between the differential outputs and respective (inverted) differential inputs of the first amplifier stage AMP1. In this configuration, the first amplifier stage AMP1 functions in part as an integrator to suppress noise contribution from the second amplifier stage AMP2, as well as to relax the linearity requirement of the second amplifier stage AMP2. In this manner, power consumption of the second amplifier stage AMP2 may be reduced without negatively impacting the overall performance of the line driver circuit 500.

Figure 6:
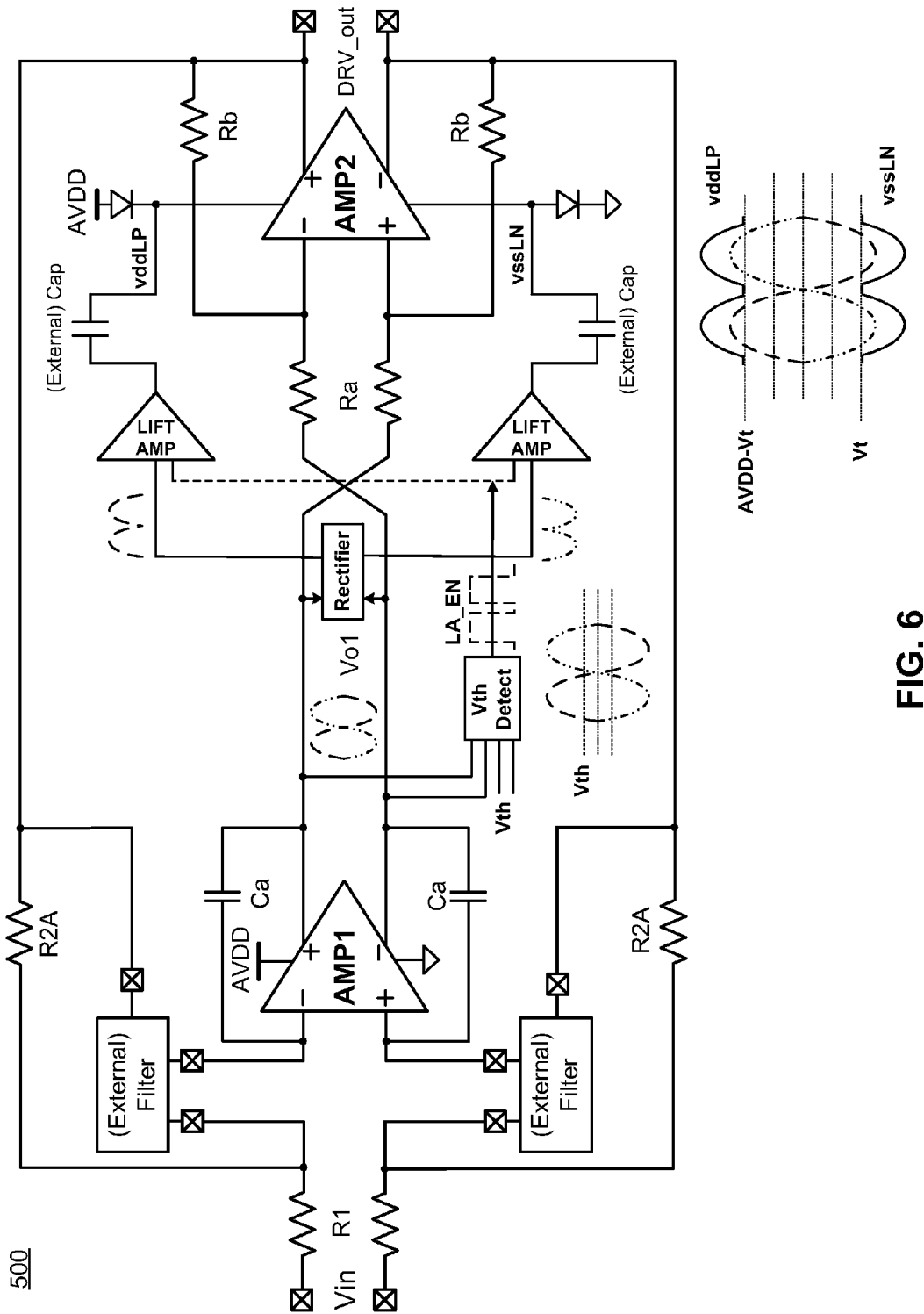
FIG. 6 illustrates further details of the line driver circuit of FIG. 5 in accordance with an embodiment of the present disclosure.

FIG. 6 illustrates further details of a line driver circuit 500 in accordance with the embodiment of FIG. 5 of the present disclosure. In this implementation, a pair of lift amplifiers is provided to modulate the voltage supply levels vddLP and vssLN of the second amplifier stage AMP2 based on rectified versions of the differential output Vo1 of the first amplifier stage AMP1 (illustrated waveforms at the inputs of the lift amps). As previously indicated, capacitors couple the outputs of the lift amplifiers to the variable voltage supply rails such that modulation of the voltage supply levels vddLP and vssLN is based on AC components of the signals generated by the lift amplifiers.

In the illustrated configuration (ADSLx transmission mode), the external passive filters result in a relatively long signal propagation delay from the differential outputs DRV_out of the second amplifier stage AMP2 and the inputs of the first amplifier stage. In order to counter the effect of this propagation delay and improve signal delay matching between the lift voltage supply path and the signal driver path during Class-H operation, the lift amplifiers are enabled by a control signal LA_EN provided by voltage threshold detection circuitry (Vth Detect). In particular, the voltage threshold detection circuitry is configured to compare one or more predetermined threshold voltages Vth to the differential output Vo1 of the first amplifier stage AMP1. When such outputs exceed the predetermined threshold voltages Vth, the lift amplifier enable signal LA_EN is asserted and the lift amplifiers are enabled to modulate the voltage supply levels vddLP and vssLN of the second amplifier stage AMP2 (as shown, for example, by the illustrated waveforms for vddLP and vssLN).

It is noted that the predetermined threshold voltages Vth may be tailored for a particular transmission mode.

Figure 7:
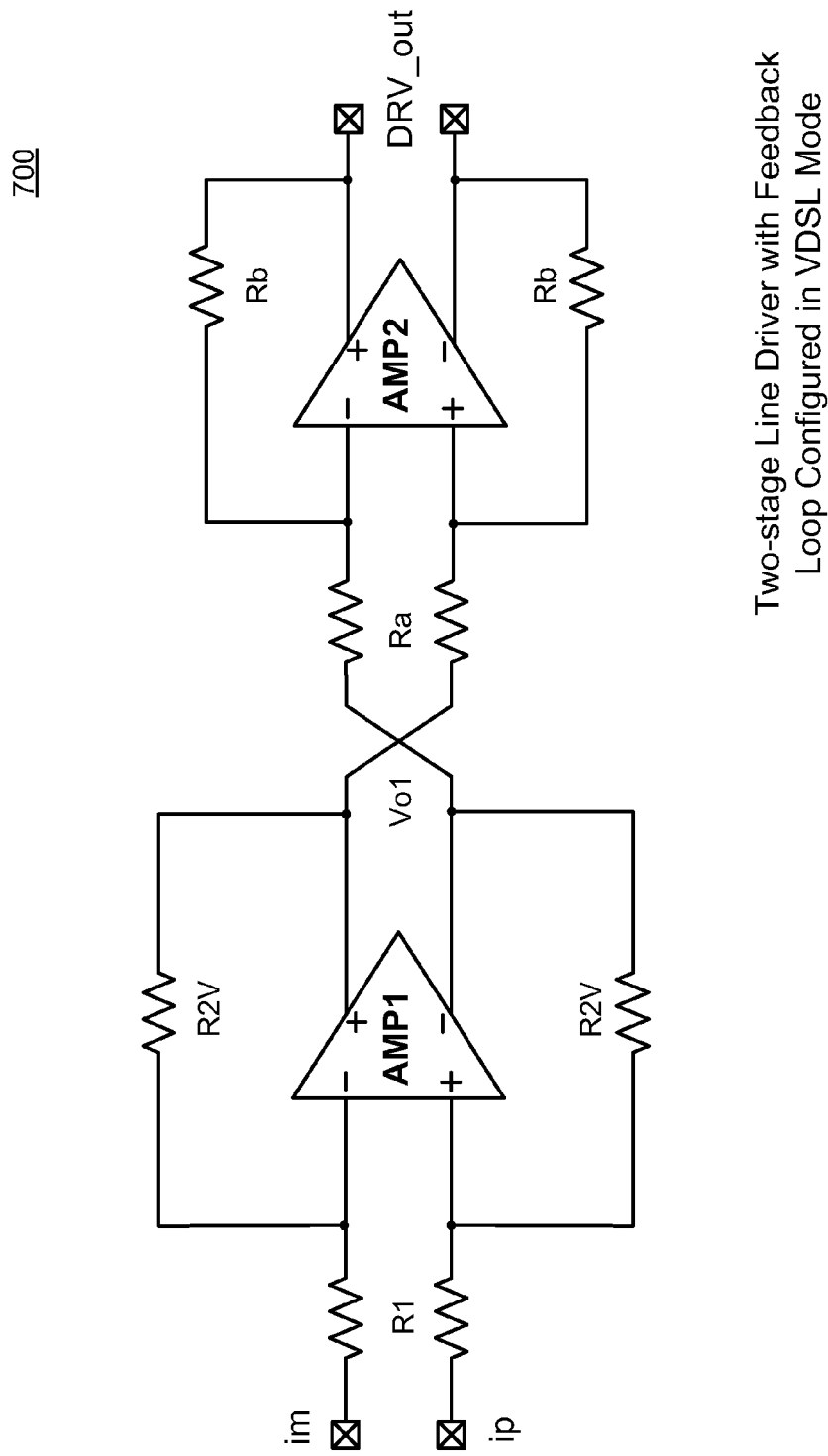
FIG. 7 is a line driver circuit configured to operate in a VDSLx mode in accordance with an embodiment of the present disclosure.

FIG. 7 is a line driver circuit 700 configured to operate in a VDSLx mode in accordance with an embodiment of the present disclosure. In this transmission mode, feedback resistors R2V are employed for the first amplifier stage AMP1. Likewise, feedback resistors Rb are employed for the second amplifier stage AMP2. As will be appreciated, values for these feedback resistors are selected (in conjunction with resistors R1 and Ra) such that a gain distribution is realized across the cascaded amplifier stages in order to achieve the desired signal bandwidth and output power for a given transmission mode (e.g., VDSL30a) with good linearity.

Figure 8:
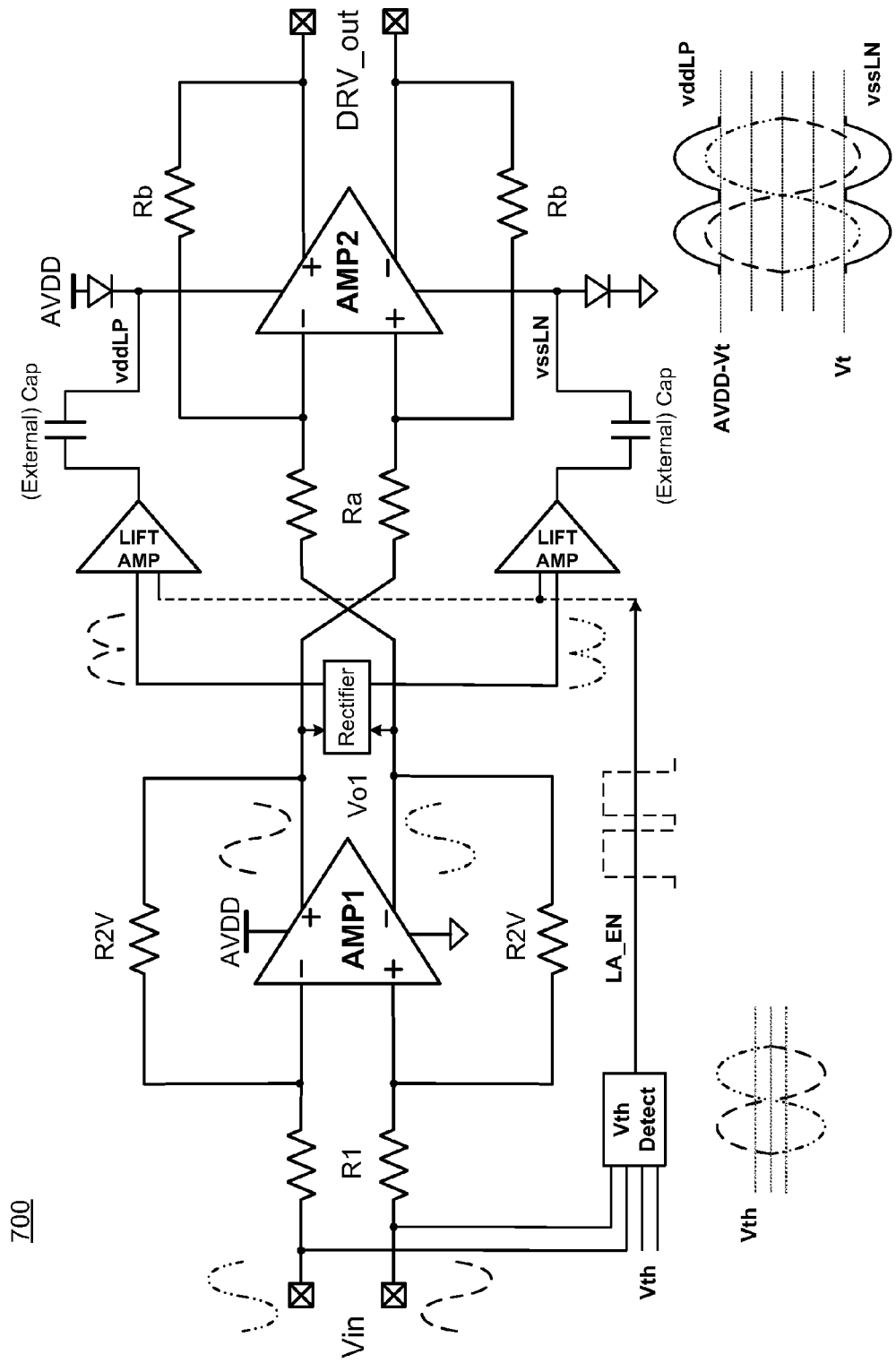
FIG. 8 illustrates further details of the line driver circuit of FIG. 7 in accordance with an embodiment of the present disclosure.

Referring now to FIG. 8, further details of the line driver circuit 700 of FIG. 7 are illustrated. In this embodiment of the present disclosure, a pair of lift amplifiers is provided to modulate the voltage supply levels vddLP and vssLN of the second amplifier stage AMP2 based on rectified versions of the differential output Vo1 of the first amplifier stage AMP1 (illustrated waveforms at the inputs of the lift amps). As noted, capacitors couple the outputs of the lift amplifiers to the variable voltage supply rails such that modulation of the voltage supply levels vddLP and vssLN is based on the AC portions of the output signals generated by the lift amplifiers.

In contrast to the embodiment of FIG. 6, the illustrated configuration (VDSLx transmission mode) utilizes input signal Vin of the line driver circuit 700 as input(s) to the voltage threshold detection circuitry (Vth Detect) for purposes of generating the control signal LA_EN that enables the lift amplifiers. In this manner, the signal delay through the first amplifier stage AMP1 can be used to provide additional signal processing time for generating the control signal LA_EN in order to compensate for the relatively short cumulative signal path delay during operation in, for example, a VDSLx transmission mode.

Figure 9:
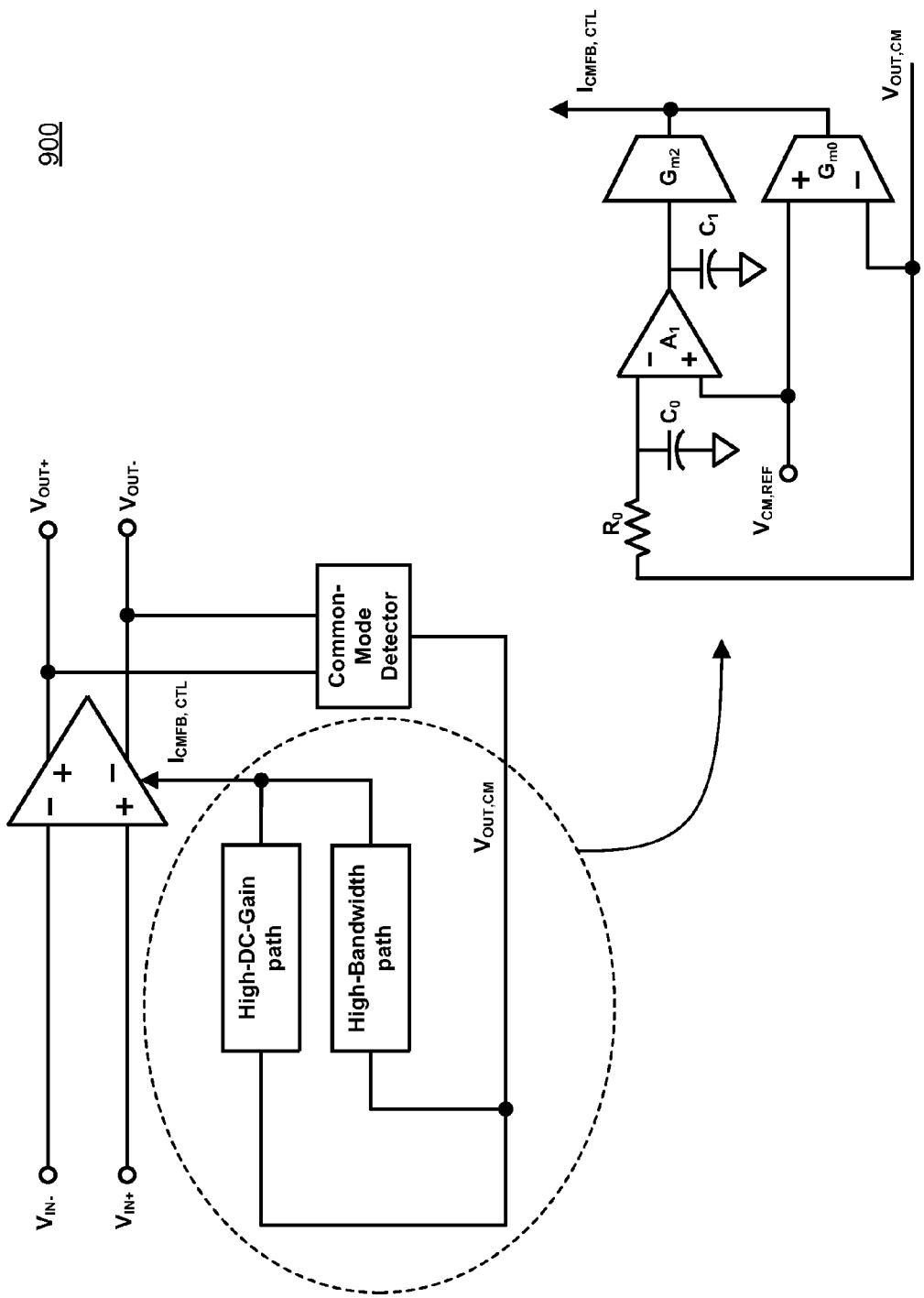
FIG. 9 is a dual-loop common mode feedback implementation of a first amplifier stage in accordance with an embodiment of the present disclosure.

FIG. 9 is a dual-loop common mode feedback (CMFB) implementation of a first amplifier stage 900 in accordance with an embodiment of the present disclosure. The dual-loop CMFB circuit of this embodiment consists of a common mode detector circuit and high bandwidth feedback path/loop realized through transconductance stage Gm0, and a high-DC-gain feedback path/loop implemented by amplifier A1 and transconductance stage Gm2. At low frequencies, the high-DC-gain path dominates the CMFB loop transfer function, thereby improving the low frequency gain by A1*Gm2/Gm0, resulting in an equivalent reduction in the common mode output offset voltage. At high frequencies, the high bandwidth path dominates the CMFB loop transfer function and determines stability. Resistor R0 and compensation capacitors C0 and C1 are used to provide feedback loop stability. In certain embodiments, transconductance stage Gm2 may be implemented as a part of the amplifier bias circuitry.

Figure 10:
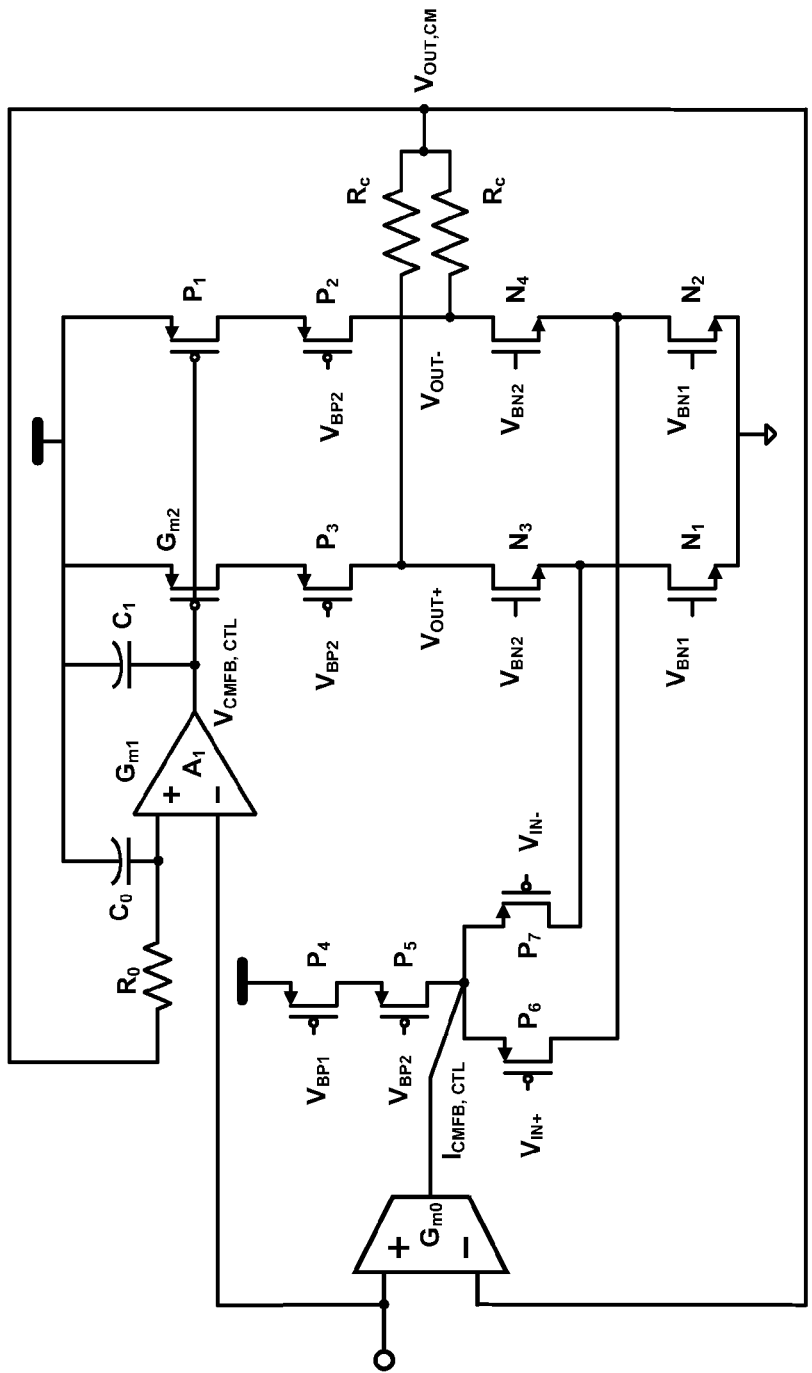
FIG. 10 is a detailed circuit diagram of the dual-loop common mode feedback implementation of the first amplifier stage of FIG. 9 in accordance with an embodiment of the present disclosure.

FIG. 10 is a detailed circuit diagram of the dual-loop CMFB implementation of the first amplifier stage of FIG. 9 in accordance with an embodiment of the present disclosure. In this embodiment, the common mode detector circuit is implemented by resistors Rc, and provides an indication of the common mode offset voltage ($V_{OUT,\ CM}$) at the differential outputs of the amplifier stage. In a first feedback loop through transconductance Gm0, current mode feedback ($I_{CMFB,\ CTL}$) functions to provide wideband, low gain feedback through the common source node of the differential input PMOS transistors P6 and P7. In the second feedback loop, the output of amplifier A1 ($V_{CMFB,\ CTL}$) drives the gates of and PMOS transistors Gm2 and P1, thereby providing high DC gain and reducing common mode offset by a factor of A1*Gm2/Gm0.

In the illustrated folded cascode amplifier architecture, current source PMOS transistors P4 and P5 are biased by voltages $V_{BP1}$ and $V_{BP2}$, respectively. The gates of cascode bias PMOS transistors P2 and P3 are similarly driven by bias voltage $V_{BP2}$, while the gates of cascode NMOS transistors N1 and N2 are driven by bias voltage $V_{BN2}$. The gates of current source load NMOS transistors N3 and N4 are maintained at constant bias voltage $V_{BN1}$.

Figure 11:
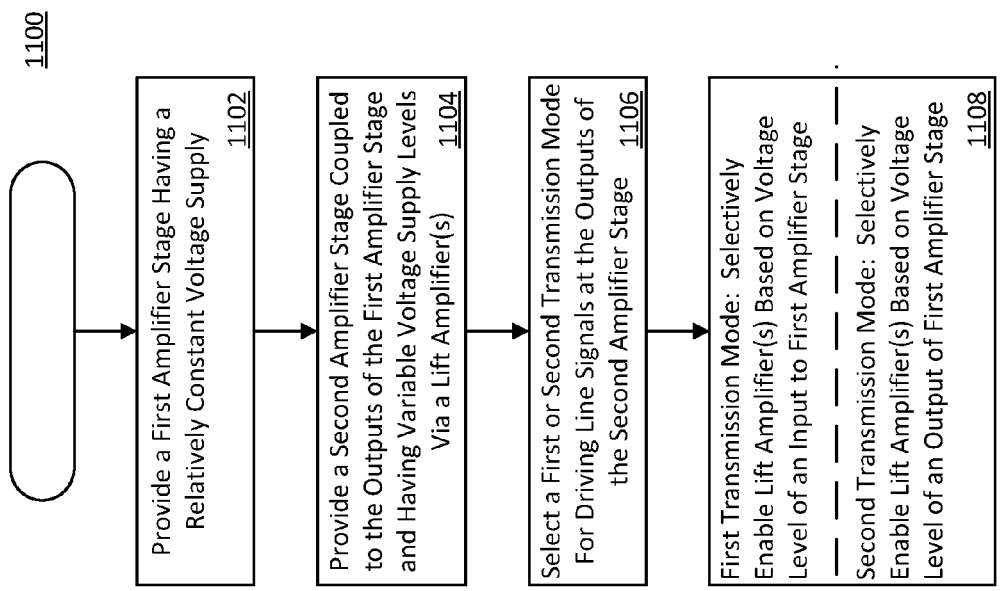
FIG. 11 is an operational flow diagram illustrating a method for providing multi-mode transmissions in accordance with an embodiment of the present disclosure.

FIG. 11 is an operational flow diagram illustrating a method 1100 for providing multi-mode transmissions in accordance with an embodiment of the present disclosure. In step 1102, a first amplifier stage is provided. The first amplifier stage is operable at constant or relatively constant (e.g., within the specified operating parameters of an integrated circuit device) voltage supply levels. A second amplifier stage is also provided (step 1104), and is coupled to the outputs of the first amplifier stage. The second amplifier stage is operable at variable voltage supply levels as determined by the output(s) of one or more lift amplifiers.

Next, in step 1106, a first or second transmission mode is selected for driving line signals at the outputs of the second amplifier stage. If a first transmission mode is selected as shown in step 1108, the lift amplifier(s) is selectively enabled based on the voltage level of an input signal to the first amplifier stage. If the second transmission mode is selected, the lift amplifier(s) is instead selectively enabled based on the voltage level of an output of the first amplifier stage. In one exemplary embodiment, the first and second amplifier stages are operated in a differential manner to drive differential signals on a transmission line.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributed (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A line driver circuit, comprising:
    a first amplifier stage configured to receive and amplify an input signal, the first amplifier stage having differential outputs;
    a second amplifier stage coupled to the differential outputs of the first amplifier stage and configured to further amplify the input signal for transmission in one of a first transmission mode and a second transmission mode;
    at least one lift amplifier having an input coupled to an output of the first amplifier stage, the lift amplifier operable to selectively vary the voltage supply of the second amplifier stage based, at least in part, on an operable transmission mode;
    a plurality of passive elements;
    a first plurality of mode switches configured to selectively establish a first feedback loop from a first set of the plurality of passive elements to support the first transmission mode; and
    a second plurality of mode switches configured to selectively establish a second feedback loop from a second set of the plurality of passive elements to support the second transmission mode.

2. The line driver circuit of claim 1, wherein the voltage supply of the first amplifier stage is maintained at a constant or near constant level.

3. The line driver circuit of claim 1, wherein the first transmission mode is an asymmetric digital subscriber line (ADSL) transmission mode, and the second transmission mode is a very high speed digital subscriber line (VDSL) transmission mode.

4. The line driver circuit of claim 1, the first amplifier stage configured to receive a differential input signal, wherein the first and second amplifier stages comprise differential amplifiers.

5. The line driver circuit as recited in claim 1 operable as a Class-H amplifier.

6. The line driver circuit of claim 1, further comprising:
    voltage threshold detection circuitry having an input coupled to an input of the first amplifier stage, and an output coupled to the at least one lift amplifier,
    the voltage threshold detection circuitry configured to selectively enable the at least one lift amplifier upon detecting that the input of the first amplifier stage meets or exceeds a predetermined threshold voltage.

7. The line driver circuit of claim 6, the predetermined threshold voltage selected to support operation in an ADSL transmission mode.

8. The line driver circuit of claim 1, further comprising:
    voltage threshold detection circuitry having an input coupled to an output of the first amplifier stage, and an output coupled to the at least one lift amplifier,
    the voltage threshold detection circuitry configured to selectively enable the at least one lift amplifier upon detecting that the output of the first amplifier stage meets or exceeds a predetermined threshold voltage.

9. The line driver circuit of claim 8, the predetermined threshold voltage selected to support operation in a VDSL transmission mode.

10. The line driver circuit of claim 1, the first amplifier stage further comprising:
    a dual-loop common mode feedback circuit having a loop transfer function, comprising:
        a common mode detector configured to provide an indication of the common mode offset voltage at the differential outputs;
        a first common mode feedback loop coupled to the common-mode detector and configured as high-DC-gain feedback path; and
        a second common mode feedback loop coupled to the common-mode detector and configured as a high bandwidth feedback path that dominates the loop transfer function at relatively high frequencies.

11. A communication device, comprising:
    a complementary metal-oxide semiconductor (CMOS) integrated circuit device comprising a line driver circuit for providing output signals, the line driver circuit comprising:
        a first differential amplifier stage configured to receive and amplify an input signal, the first amplifier stage having differential outputs;
        a second differential amplifier stage coupled to the differential outputs of the first amplifier stage and configured to further amplify the input signal in accordance with one of a first transmission mode or a second transmission mode;
        a rectifier coupled to the differential outputs of the first amplifier stage to provide rectified outputs; and
        at least one lift amplifier having an input coupled to a rectified output of the first differential amplifier stage, the at least one lift amplifier operable to selectively vary the voltage supply of the second differential amplifier stage based, at least in part, on the operable transmission mode.

12. The communication device of claim 11, wherein the voltage supply of the first amplifier stage is maintained at a relatively constant level.

13. The communication device of claim 11, wherein the first transmission mode is an asymmetric digital subscriber line (ADSL) transmission mode, and the second transmission mode is a very high speed digital subscriber line (VDSL) transmission mode.

14. The communication device of claim 11, the line driver circuit further comprising:
   voltage threshold detection circuitry having an input coupled to the first amplifier stage, and an output coupled to the at least one lift amplifier, wherein
   during operation of the communication device in the first transmission mode the voltage threshold detection circuit configured to enable the at least one lift amplifier upon detecting that at least one input of the first amplifier stage meets or exceeds a predetermined threshold voltage, and
   during operation of the communication device in the second transmission mode the voltage threshold detection circuit configured to enable the at least one lift amplifier upon detecting that at least one output of the first amplifier stage meets or exceeds a predetermined threshold voltage.

15. The communication device as recited in claim 11 operable as an xDSL modem.

16. The communication device of claim 11, the first amplifier stage further comprising:
   a dual-loop common mode feedback circuit having a loop transfer function, comprising:
      a common mode detector configured to provide an indication of the common mode offset voltage at the differential outputs;
      a first common mode feedback loop coupled to the common-mode detector and configured as high-DC-gain feedback path; and
      a second common mode feedback loop coupled to the common-mode detector and configured as a high bandwidth feedback path that dominates the loop transfer function at relatively high frequencies.

17. A method for driving a signal on a transmission line in accordance with a plurality of transmission modes, comprising:
   a first amplifier stage having a relatively constant voltage supply amplifying an input signal;
   a second amplifier stage amplifying output signals of the first amplifier stage to generate the signal on the transmission line;
   selecting a transmission mode from a first transmission mode and a second transmission mode;
   varying the voltage supply of the second amplifier stage based, at least in part, on the selected transmission mode;
   when the first transmission mode is selected, establishing a first feedback loop from a first set of a plurality of passive elements via first transmission mode switch settings; and
   when the second transmission mode is selected, establishing a second feedback loop from a second set of the plurality of passive elements via second transmission mode switch settings.

18. The method of claim 17, wherein varying the voltage supply of the second amplifier stage comprises:
   at least one lift amplifier having an input coupled to an output of the first amplifier stage varying the voltage supply of the second amplifier.

19. The method of claim 18, further comprising:
   in response to selection of the first transmission mode, selectively enabling the at least one lift amplifier based on the voltage level of an input to the first amplifier stage; and
   in response to selection of the second transmission mode, selectively enabling the at least one lift amplifier based on the voltage level of an output of the first amplifier stage.

20. The method of claim 17, wherein the first transmission mode is an asymmetric digital subscriber line (ADSL) transmission mode, and the second transmission mode is a very high speed digital subscriber line (VDSL) transmission mode.

* * * * *